United States Patent Office 2,953,557
Patented Sept. 20, 1960

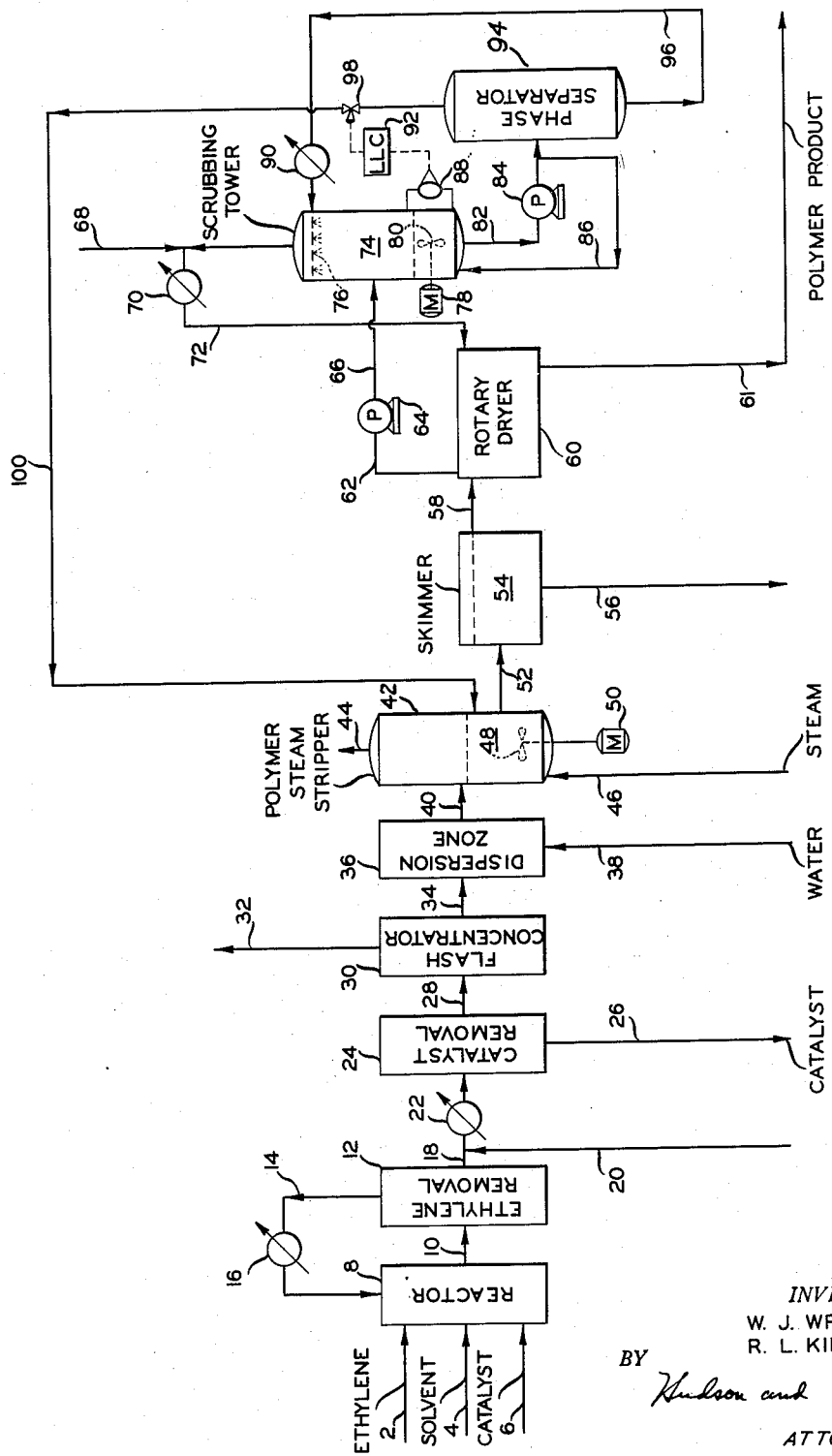

2,953,557

RECOVERY OF ENTRAINED POLYMER SOLIDS FROM GASES

William James Wride, Bartlesville, Okla., and Richard L. Kimmel, Pasadena, Tex., assignors to Phillips Petroleum Company, a corporation of Delaware Filed Sept. 24, 1956, Ser. No. 611,528

4 Claims. (Cl. 260—94.9)

This invention elates to the recovery of entrained solids from gases. In one aspect it relates to the treatment of purged gases from a polymer dryer for the recovery of entrained polymer dust. In another aspect, solids and a normally liquid material are recovered from purged gases from a polymer dryer by combination of quenching and liquid phase separation. In still another aspect the invention relates to a method for controlling a process in which entrained polymer dust and a normally liquid material are recovered from purge gases from a polymer dryer by a combination of quenching and liquid phase separation.

In many processes in which a solid material is recovered as a product, particularly in processes in which drying or other operations are performed wherein gases are employed, the problem arises of separating entrained solids from the gaseous materials. Frequently, these solids are in a finely subdivided form and are present in a relatively dilute concentration, such that their recovery by filtration, centrifugation etc. is not feasible.

It is an object of this invention to provide an improved process for the recovery of entrained solids from gases.

Another object of this invention is to provide an improved process for the recovery of entrained polymer solids from gases.

Still another object of this invention is to provide an improved process for the recovery of entrained solids from a gas containing a normally liquid material.

Yet another object of the invention is to provide an improved method for controlling a process for the recovery of entrained solids from a gas containing a normally liquid material.

These and other objects of the invention will become more readily apparent from the following detailed description and discussion.

The foregoing objects are achieved broadly by contacting a gaseous material containing a subdivided solid and at least one normally liquid material with a quenching and scrubbing liquid which is at least partially immiscible with the normally liquid material whereby the solid and normally liquid material are removed from the gaseous material, said subdivided solids having a density intermediate between the density of the scrubbing liquid and the normally liquid material, passing the mixture of scrubbing liquid, solids and normally liquid material to a phase separation zone wherein at least two liquid phases are formed and separating at least one liquid phase and solids from the other liquid phase.

As used herein the term "normally liquid material" means a material which is liquid at normal atmospheric temperatures such as, between 32° F. and 100° F. and atmospheric pressure.

In one aspect of the invention, the gaseous material contains at least two normally liquid materials, one of which is the same as the quenching and scrubbing liquid.

In another aspect of the invention, the flow of the combined liquid phase-solids stream from the phase separation zone is controlled responsive to and directly proportional to the liquid level in the zone wherein the quenching and scrubbing step takes place.

The process of this invention is applicable in general to the recovery of solids from a gaseous material. For example, it can be used in various processes wherein a finely divided solid product is obtained such as in coal carbonization, phthalic anhydride production, olefin polymerization, etc. The process is particularly applicable to those operations in which substantial quantities of solid fines are produced. One such process is the polymerization of olefins to solid polymers.

Solid olefin polymers are prepared usually by contacting the olefin to be polymerized with a catalyst at an elevated temperature and pressure, preferably in the presence of a solvent or diluent material. The reaction product can be one of a wide variety of olefin polymers, such as for example, polymers, or copolymers of mono-olefins like ethylene, propylene, butylene, etc., also copolymers of mono-olefins and diolefins such as butadiene, isoprene, etc.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure is often maintained at a sufficient level to assure a liquid phase reaction, that is at least about 100 to 300 p.s.i.g. depending upon the type of feed material and the polymerization temperature. Higher pressure up to 500 to 700 p.s.i.g. or higher can be used, if desired. When utilizing a fixed catalyst bed the space velocity varies from as low as about 0.1 to about 20 volumes of feed per volume of catalyst per hour, with the preferred range being between about 1 and about 6 volumes per volume. The polymerization process can also be carried out in the presence of a mobile catalyst. In this type of operation the catalyst concentration in the reaction zone is maintained between about 0.01 and about 10 percent by weight. Residence time can be from 10 minutes or less to 10 hours or more.

A preferred polymerization method is described in detail in a copending application of Hogan and Banks, Serial No. 573,877, filed March 26, 1956 now Patent No. 2,825,721. This particular method utilizes a chromium oxide catalyst, preferably containing hexavalent chromium, with silica, alumina, silica-alumina, zirconia, thoria, etc. In one embodiment of this application, olefins are polymerized in the presence of a hydrocarbon diluent, for example an acyclic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystalinity at normal atmospheric temperatures.

Other less advantageous and nonequivalent procedures which employ different catalysts are also used for preparing olefin polymers. For example, polymers are prepared in the presence of organometallic compounds such as triethyl aluminum plus titanium tetrachloride, mixtures of ethylaluminum halides with titanium tetrachloride, and the like. Another group of catalysts which is used comprises a halide of a Group IV metal such as, for example, titanium tetrachloride, silicon tetrabromide, zirconium tetrachloride, tin tetrabromide, etc. with one or more free metals selected from the group consisting of sodium, potassium, lithium, rubidium, zinc, cadmium and aluminum.

The solvent or diluent employed in the polymerization reaction includes in general, paraffins which dissolve the polymers at the temperature employed in the reaction zone. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane, etc. Aromatic diluents are also used, however in some instances they (or impurities therein) tend to shorten the catalyst life, therefore their use will depend on the importance of catalyst life. All of the foregoing and in addition other hydrocarbon diluents which are relatively inert and in the liquid state at the reaction conditions may also be employed in carrying out the reaction of olefins to form solid polymers.

It is apparent from the preceding discussion that the solid polymers prepared by the aforedescribed methods are present in the reaction effluent as a solution of polymer in a solvent or diluent. Inasmuch as the major uses of the polymers require a solid product, it is desirable that the polymer be separated from the solvent material. Several methods have been proposed for treating the polymer solution to accomplish this purpose. In one method, the polymer solution is sprayed into liquid water whereby the polymer is dispersed in the water and removed from solution. This operation is carried out by combining water at a temperature between about 60° F. and about 110° F. with a polymer solution having a temperature of between about 350° F. and about 200° F. to provide a mixture of polymer, water and solvent having a temperature between about 110° F. and about 150° F. More usually, the amount of water required is between about 1 and about 5 pounds per pound of polymer solution. Sufficient pressure is required during the process to maintain this solvent and water in the liquid state. This process is described in detail in a copending application of R. G. Wallace, Serial No. 584,812, filed May 14, 1956, now abandoned.

As a result of the foregoing treatment, the polymer product is obtained as a slurry of finely divided solids in a mixture of water and solvent. To obtain the desired dry product the slurry is treated first for the removal of the major portion of the solvent and then for the removal of the major portion of the water. In one method, solvent removal is effected by steam distillation following which the major amount of water is removed in a skimming operation. A substantially dry product is then obtained by removing residual water and solvent by drying, for example, with a heated gas which is inert to the polymer. Various gases can be used for this purpose, including nitrogen, low boiling hydrocarbons, such as methane, ethane, ethylene, etc., flue gas and the like. Air, while not entirely inert with respect to the polymer, can also be used for this purpose. During the drying operation, the drying or purge gas entrains a quantity of finely divided polymer. More usually this polymer ranges in size between about 1 and about 500 microns. The quantity of polymer entrained varies depending on the quantity and velocity of the drying gas through the dryer, and may range from as low as about 0.001 pound per pound of gas to as high as about 0.1 pound per pound. The temperature and quantity of the drying or purge gas depends on the amount of polymer to be dried, the quantity of residual water and solvent and the particular solvent employed. More usually, the quantity of drying gas based on the dry polymer varies between about 0.5 and about 10 pounds per pound and the gas temperature before entering the dryer is between about 100 and about 250° F.

The gas leaving the drying zone contains, therefore, dry polymer solids and in addition a quantity of water and solvent. Usually, the water and solvent are completely vaporized, however, for the purposes of this invention they can also be present in the form of fine liquid droplets. The quantity of each of the normally liquid components, namely water and solvent, in the drying gas, depends primarily on the efficiency of the previous operations employed for the removal of these materials. Usually, each of these components is present in an amount between about 5 and about 200 pounds per pound of entrained polymer.

In carrying out the invention, in one embodiment thereof, the purge gas containing entrained polymer solids, such as ethylene polymer, water vapor and vaporized solvent, such as cyclohexane, is introduced to a scrubbing zone, wherein the gases and solids are contacted with a quench and scrubbing liquid, preferably the same as one of the normally liquid components present in the gas. Either of these components can be used for the scrubbing operation. The one so employed depends on a number of factors, including their heats of vaporization, their viscosities, their condensing temperatures and their corrosive action on the various equipment employed in the quenching and scrubbing system, such as condensers, spray nozzles, etc. In this particular instance, the preferred liquid is water, therefore, this material is used for quenching and scrubbing. However, when treating other types of gas-solid mixtures, it is sometimes desirable to use an extraneous material for this purpose. In this event it is necessary that the extraneous material be at least partially immiscible with one or more of the normally liquid materials in the gas to be scrubbed.

As a result of the quenching and scrubbing operation, polymer solids are removed from the gases and the solvent and water vapor are condensed. The gases saturated with water vapor are removed overhead from the scrubbing zone and are either discarded or are passed through a heating step and recycled to the polymer dryer. Condensed water vapor, solids and condensed solvent accumulate in the bottom of the scrubbing zone, along with water used for quenching and scrubbing. The accumulated material is removed continuously and introduced to a phase separator wherein the water and solvent separate into two liquid phases with the solids accumulating in a third phase between said phases. The composition of the third phase depends on the particular solids being treated and the materials present in the two liquid phases. Usually the solids are preferentially wetted by one of the two liquids and this material forms the continous portion of the third phase. Thus when, as in the present instance, the solids are olefin polymers and the liquid phases are water and a solvent, such as cyclohexane, the solids are preferentially wetted with solvent, and solids phase comprises principally polymer in cyclohexane. When the invention is applied to the treatment of systems containing other solids and liquids the solid phase can comprise solids in one or another of the liquids or in mixtures thereof, depending on the wetting characteristics of the liquids employed.

The water, which forms the bottom of the three phases, is withdrawn continuously from the phase separator and recycled through a cooler to the scrubbing zone. Thus, this phase in effect is passed continuously through a closed circuit. The solvent phase and adjoining accumulated polymer solids are removed overhead from the phase separator and recycled to the polymer stripping zone wherein solvent is separated from the ethylene polymer by steam stripping. In order to prevent accumulation of polymer solids between the two phases in the phase separator, it is desirable that the separator be maintained liquid full and that the lower solids-liquid interface be carried either in the upper portion of the separator or entirely outside the separator, namely, in the line from the separator to the polymer steam stripping zone. To maintain the phase separator liquid full, a control valve is conveniently placed in the overhead line from the separator. This valve is actuated by the level in the bottom of the scrubbing tower, thereby assuring a continuous liquid full system between these two points. To prevent plugging in the bottom portion of the scrubbing tower and in the bottom outlet conduit therefrom, means are provided to maintain the polymer solid in suspension. This can be done by mechanical agitation or by recycling a quantity of the material withdrawn from the bottom of the scrubbing tower.

The quantity of quench and scrubbing liquid used in the scrubbing tower depends on the temperature of this material as it enters the tower and on the quantity of solids and normally liquid materials which must be removed from the purge gas. In this specific embodiment, the water is introduced to the scrubbing tower at a temperature of between about 60° F. and about 100° F. and the quantity of water is controlled to provide a solids-polymer-solvent mixture in the bottom of the scrubbing zone having a temperature of between about 75° F. and about 115° F. When treating gases containing other solids and other normally liquid materials the temperature of the quenching and scrubbing material can vary over a suitable range to provide a temperature below the boiling point of the normally liquid materials in the bottom of the scrubbing zone. Inasmuch as water is continuously introduced to the scrubbing and phase separation system in the purge gases, a high interface level in the phase separation zone is provided merely by operating in such a manner that excess water is withdrawn overhead from the separator along with solvent and polymer solids.

The various stages of the solids recovery system are carried out preferably at low pressures. The pressure in the drying stage will usually be set by the pressure required to introduce the drying and purge gases to this operation. Usually, therefore, the pressure in the dryer is between about atmospheric and about 20 pounds per square inch gauge. The quenching and scrubbing operation can be carried out at a pressure either above or below the pressure employed during drying depending on whether a compressor is placed in the feed gas line to the scrubbing tower or whether the gases are compressed after leaving this tower and before reintroduction to the dryer. Phase separation also is preferably carried out at a low pressure, however, it is desirable that the pressure in this operation be sufficient so that the phases separated therein can be returned to the scrubbing tower and the polymer steam stripping zone respectively without the necessity of additional pumping means.

Recovery of olefin polymer solids from gases in the aforedescribed method typifies an operation in which the gaseous feed material provided for treatment contains two normally liquid materials, one of which is the same as the quenching and scrubbing liquid. As previously stated, it is within the scope of the invention to treat gases containing one, two or more normally liquid materials, and the quench and scrubbing liquid need not be the same as any of the normally liquid materials present in the solids containing gas. Thus, for example, in the treatment of a gaseous effluent from a coal carbonization process containing solid char particles and distilled tar materials, it is desirable in view of the viscosity of the distilled tar materials, to quench and scrub the solids containing gases with an extraneous liquid such as water, which would be less apt to plug the heat exchange and nozzle system required in the quench and scrubbing circuit. The method of this invention is also applicable in the treatment of gases containing more than two mutually immiscible liquids, whereby more than two liquid phases are formed, in the phase separation zone, with the solids being recovered along with one or more of the liquid phases.

In order to more clearly define the invention and provide a better understanding thereof, reference is had to the accompanying drawing which is a diagrammatic illustration of a polymerization unit and a polymer recovery system comprising a polymer steam stripper, a water system skimmer and a rotary dryer, followed by a quench and scrubbing tower and a phase separator for treating solids-containing purge gases from the rotary dryer.

Referring to the figure, ethylene, chromium oxide catalyst and cyclohexane diluent are introduced to reactor 8 through conduits 2, 4 and 6 respectively. For ease of handling, the catalyst is slurried in cyclohexane before it is introduced to the reactor. During polymerization the material in the reactor is maintained in a highly agitated state by means of a mechanical mixer or other conventional mixing means (not shown). The reaction is carried out at a temperature at about 285° F. and a pressure of about 500 p.s.i.a., and for a sufficient period of time to convert a portion of the ethylene feed to solid ethylene polymer (at ambient temperatures). The reaction effluent leaves the reactor through conduit 10 and enters a separation zone 12 wherein a stream comprising principally unconverted ethylene and some solvent is separated and returned to the reactor through conduit 14 and cooler 16. Following this step the effluent is combined with additional solvent introduced through conduit 20. The mixture then passes through an exchanger 22 wherein the temperature is increased to assure dissolution of substantially all of the polymer in the solvent material. The effluent then passes to catalyst recovery zone 24 through conduit 18. This zone may be a filter, a centrifuge, or the like, designed to operate at superatmospheric pressure. Separated catalyst, which is removed through conduit 26, can be recycled to the reactor or discarded. As necessary, all or part of the recycled catalyst can be subjected to a regeneration treatment with oxygen for the removal of heavy polymers deposited thereon during polymerization. The remaining reaction effluent, now comprising a solution of polyethylene in cyclohexane, is introduced to flash concentrator 30. In this vessel cyclohexane is vaporized, removed through conduit 32 and recycled to the cyclohexane feed to the reactor (not shown). In this manner, the concentration of diluent in the reaction effluent is reduced to a suitable level for the polymer precipitation operation. Removal of cyclohexane in the flash concentrator is effected by reducing the pressure, or by increasing the temperature, or both.

The polymer solution from the flash concentrator passes through conduit 34 into dispersion zone 36. This zone contains water, introduced thereto through conduit 38, which is at a temperature substantially lower than the entering polymer solution so that the temperature of the total material in the dispersion zone is reduced below the level at which polymer precipitates from solution. The polymer solution is dispersed into the water, for example, by means of a spray nozzle whereby the polymer is precipitated as a substantially homogeneous finely divided solid.

The effluent from the dispersion zone 36, in the form of a slurry of finely divided precipitated polymer in water and cyclohexane solvent, is introduced through conduit 40 to a polymer steam stripper 42. Within the steam stripper there is maintained an accumulation of liquid and polymer from which solvent is vaporized by the introduction of steam through conduit 46. In the bottom of the steam stripper a stirrer 48 driven by motor 50 is provided for the purpose of providing agitation and maintaining the polymer in suspension. Vaporized solvent and steam pass overhead from the stripper through conduit 44. Usually, this material is further treated for the separation of water and solvent and the solvent is recycled for use in the polymerization process as desired. The liquid material in the stripper which comprises essentially polymer and water, with a small amount of solvent, is removed therefrom through conduit 52 and introduced to a skimmer 54, wherein the polymer is separated by flotation and skimming. The major portion of the water is removed in this operation and is withdrawn from the skimmer through conduit 56. The skimmed polymer, wetted with solvent and water, is then introduced through conduit 58 to a dryer 60 wherein the wet polymer is contacted with a heated gas, such as nitrogen. This drying gas is supplied principally from the scrubbing tower through conduit 72 and heater 70. An additional amount of gas is provided through conduit 68 to compensate for losses from the system. The drying gases in their passage through the dryer vaporize the water and solvent from the polymer and the dried polymer is removed from the dryer through conduit 61 as a final product.

In its preferred form, the polymer product is obtained in a finely divided homogeneous form. This is effected by appropriately controlling polymer precipitation from the solution leaving the polymerization zone. Thus, the polymer entering the dryer is in a finely subdivided form, ranging in size from between about 1 to about 500 microns. However, the particles may be agglomerated to particles as large as ½ inch in diameter. In order to provide effective drying, it is necessary that the drying gas pass through the dryer at a velocity between about 0.1 and about 2 feet per second. As a result, a portion of the lighter polymer particles are entrained in the gas and carried from the dryer. For the purpose of recovering this material and the solvent vaporized from the polymer, the purge gas is introduced through conduit 62 and compressor 64 to a scrubbing tower 74. In this vessel, the gases contact cool water introduced through spray nozzles 76 whereby the solids are scrubbed from the gases and steam and vaporized solvent contained therein are condensed. The purge gases which are saturated with water vapor and solvent at the temperature and pressure of the scrubbing tower are then removed overhead through conduit 72, passed through heater 70 and returned to the dryer. The quench liquid, condensed steam, solids and condensed solvent accumulate in the bottom of the scrubbing tower, from which they are withdrawn through conduit 82 and pump 84 for introduction to phase separator 94. In order to maintain the solids in suspension, mechanical agitation is provided by stirrer 80 which is driven by motor 78. As an alternative method for agitating the polymer, provision is made to circulate a portion of the scrubbing tower bottoms through pump 84 and conduit 86. Within the phase separator 94, a separation between water and solvent takes place with the polymer solids accumulating principally in solvent, in a third phase between the two liquid phases. The heavier water phase is withdrawn from the separator through conduit 96, cooled in cooler 90 and returned to the scrubbing tower. The solvent phase and polymer solids are withdrawn overhead from the separator through conduit 100 and introduced to the polymer steam stripper 42. To maintain the phase separator liquid full, a control valve 98 is provided in the overhead line from the phase separator. This valve is actuated by liquid level controller 92 which in turn is actuated by the level in the bottom of the scrubbing tower. Due to the fact that water is continuously introduced to the quench and phase separation system in the purge gases from the dryer and no water is withdrawn from the system other than through conduit 100, the interface between the solids and water phases is automatically maintained in the uppermost portion of the phase separator. Thus, there is no accumulation and buildup of solids in the separator.

The preceding discussion has been directed to a preferred embodiment of the invention wherein a polymer solid, water and solvent are separated from gases. This, however, is not intended in any limiting sense and other solids and liquid materials can also be removed from gases within the scope of the invention. Although, in the specific embodiment shown, the lighter liquid is recycled and the heavier liquid is used for scrubbing, it is also within the scope of the invention to recycle the heavier liquid and use the lighter liquid as scrubbing. In this type of operation, the level in the quench and scrubbing tower is controlled by a valve in the conduit from the bottom of the phase separator and the interface between the two liquid phases is carried in the bottom of the separator rather than in the top.

The following example is presented to illustrate a typical application of a preferred embodiment of the invention on a commercial scale.

The ethylene polymer of this example was prepared in the presence of a catalyst comprising 2.5 percent by weight of chromium as chromium oxide, containing hexavalent chromium, with silica-alumina (wt. ratio 9:1), prepared by impregnating the silica-alumina with a solution of chromium oxide, followed by drying and activation in dry air at gradually increasing temperatures up to 950° F.

*Example*

| Flows: | Pound/hour |
|---|---|
| Wet ethylene polymer (58) | 7,900 |
| Composition: Weight percent | |
| Polymer 80 | |
| Water 15.8 | |
| Cyclohexane 2.4 | |
| Dry ethylene polymer (61) | 6,600 |
| Composition: | |
| Polymer 98 | |
| Water 2 | |
| Cyclohexane Trace. | |
| Purge gas to dryer (72) | 7,700 |
| Composition: | |
| Nitrogen 55.3 | |
| Water 2.6 | |
| Cyclohexane 42.1 | |
| Purge gas to quench and scrubbing tower (62) | 9,000 |
| Composition: | |
| Nitrogen 47.2 | |
| Water 14.8 | |
| Cyclohexane 38.0 | |
| Polymer 0.14 | |
| Scrubbing liquid (96) | 100,000 |
| Composition: | |
| Water About 100 | |
| Cyclohexane Trace. | |
| Polymer Trace. | |
| Feed to phase separator (82) | 101,300 |
| Composition: | |
| Water 99.98 | |
| Cyclohexane 0.02 | |
| Polymer Trace. | |
| | 100 |
| Phase Separator overhead (100) | 1,300 |
| Composition: | |
| Cyclohexane 14.4 | |
| Water 84.6 | |
| Polymer 1 | |
| | 100 |

Temperatures: °F
    Purge gas to dryer (72) _____ 230
    Purge gas from dryer (62) _____ 180
    Quench and scrubbing tower (74) _____ 110
    Phase separator (94) _____ 110
Pressures: P.S.I.A.
    Dryer (60) _____ 15.7
    Purge gas to dryer (72) _____ 16.7
    Purge gas from dryer (62) _____ 14.7
    Quench and scrubbing tower (74) _____ 16.7
    Phase separator 94) _____ 78

Having thus described the invention by providing a specific example thereof, it is to be understood that no undue restrictions or limitations are to be drawn by reason thereof and that many modifications and variations are clearly within the scope of the invention.

We claim:

1. In a process for the recovery of normally solid polymer of an olefin in which water is added to effluent from an olefin polymerization zone containing solvent hydrocarbon and finely subdivided solid olefin polymer, said polymer solids having a density intermediate between said hydrocarbon and water, is treated first in a steam stripping zone for the removal of the major portion of the solvent, then in a skimming zone for the removal of the major portion of the water, and then in a drying zone wherein residual water and solvent are removed, and in which the drying is conducted by contacting the polymer wet with water and solvent hydrocarbon with a heated gaseous material, finely subdivided polymer being entrained in the effluent gas from the dryer, the improvement which comprises contacting the effluent gas containing said solids, solvent and water vapor with liquid water whereby the polymer solids, solvent and water vapor are scrubbed from the gas, passing a resulting nongaseous mixture to a phase separation zone, wherein water and solvent phases are formed with an intermediate solids phase, maintaining the phase separation zone liquid full, separating the solvent phase and solids from the water phase, recycling the solvent and solids phases to the polymer steam stripping zone and recycling the water phase to the scrubbing zone.

2. In a process wherein a normally solid polymer of an olefin is recovered from admixture with a liqued hydrocarbon diluent by steps comprising vaporization of said diluent by contact with steam and subsequent drying of said polymer in the presence of a stream of gas, the improvement which comprises recovering entrained polymer particles and said hydrocarbon from said gas by contacting said gas, after said drying, with a stream of water in a scrubbing zone, and passing a resulting aqueous mixture from said scrubbing zone to a settling zone wherein said mixture stratifies to form an aqueous phase and a liquid hydrocarbon phase having said polymer admixed therewith.

3. In a process wherein a normally solid polymer of an olefin selected from the group consisting of ethylene, propylene, butadiene, and isopreen is recovered from admixture with a liquid hydrocarbon diluent by admixing with water, treating the resulting mixture with steam to vaporize diluent, removing the polymer from admixture with part of the resulting aqueous material, and drying the removed polymer in the presence of a stream of inert gas, the improvement which comprises recovering particles of said polymer from suspension in said gas by scrubbing said gas, in a scrubbing zone, with a stream of water, passing a resulting aqueous stream to a settling zone and therein causing stratification of an aqueous phase and a liquid hydrocarbon phase having said polymer associated therewith, and removing the resulting mixture of polymer and hydrocarbon.

4. In a process wherein a normally solid polyethylene is recovered from admixture with a diluent selected from the group consisting of liquid paraffinic hydrocarbons having from 5 to 12 carbon atoms per molecule, cyclohexane, and methylcyclohexane, by admixing with water, treating the resulting admixture with steam to vaporize part of said diluent, skimming the polymer from the water, and drying said polymer in the presence of a stream of inert gas, the improvement which comprises recovering particles of said polymer from suspension in said gas, by scrubbing said gas, in a scrubbing zone, with a stream of water, passing the resulting water stream from said scrubbing zone to a settling zone, causing separation of a liquid hydrocarbon phase from an aqueous phase of stratification, said polymer being concentrated in said hydrocarbon phase, and returning said hydrocarbon phase and said polymer to the described steam treatment.

References Cited in the file of this patent

UNITED STATES PATENTS

| | | |
|---|---|---|
| 1,543,942 | Mathesius | June 30, 1925 |
| 2,384,967 | Schumacher et al. | Sept. 18, 1945 |
| 2,638,437 | Ragatz | May 12, 1953 |
| 2,668,754 | Lichtenfels | Feb. 9, 1954 |
| 2,758,068 | Howard | Aug. 7, 1956 |
| 2,817,689 | White | Dec. 24, 1957 |
| 2,838,477 | Roelen et al. | June 10, 1958 |
| 2,849,433 | Schneider et al. | Aug. 26, 1958 |
| 2,877,866 | Mathis et al. | Mar. 17, 1959 |

FOREIGN PATENTS

| | | |
|---|---|---|
| 40,971 | Austria | Sept. 1, 1909 |